Figure 1:
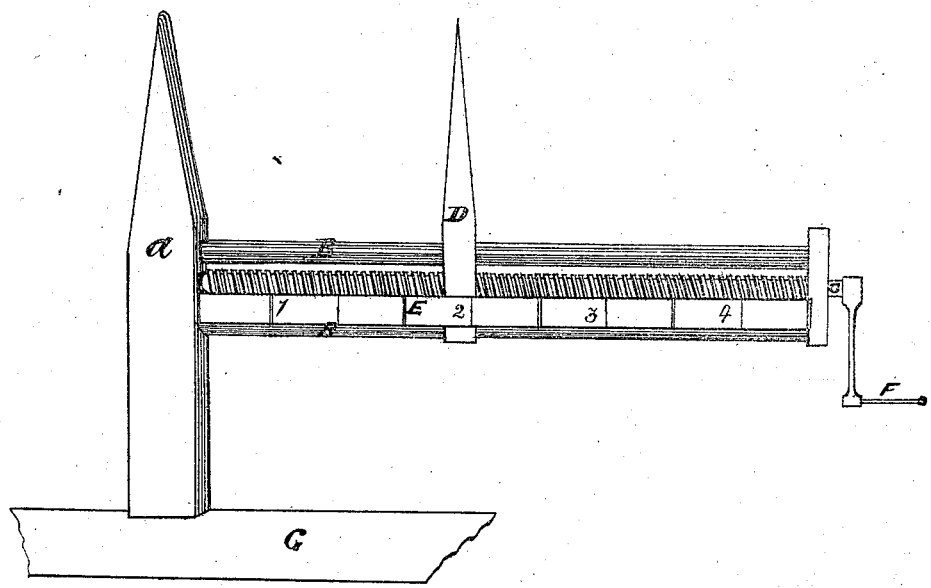

A. BINGHAM.
Tinners' Tools.

No. 133,295. Patented Nov. 26, 1872.

UNITED STATES PATENT OFFICE.

ALFRED BINGHAM, OF HAMILTON, CANADA.

IMPROVEMENT IN TINNERS' TOOLS.

Specification forming part of Letters Patent No. 133,295, dated November 26, 1872; antedated November 21, 1872.

*To all whom it may concern:*

Be it known that I, ALFRED BINGHAM, of the city of Hamilton, county of Wentworth, in the Dominion of Canada, have invented certain Improvements in Machines for Cutting Circular Pieces out of Tin, Sheet-Iron, and other Metals, of which the following is a specification:

On the annexed drawing, Figure 1 is a side view of the machine.

Letter A, circular-edged chisel fixed in the bench G; B, bars or frame of machine; C, screw-bar on which the center-point D works backward and forward; D, center-point working on the screw C; E, scale-plate attached to machine to regulate the diameter of the cut to be made; F, handle or lever attached to end of screw for revolving the same around for the purpose of moving the center-point D on the screw-bar C; G, bench in which the chisel is fitted or fixed.

On the ordinary tinsmith's bench is fitted a circular-pointed chisel in an aperture formed in the same, this chisel having a screw-rod, one end of which is fitted in it and the other in a frame-piece, and which frame-piece forms a bearing for this rod to work in by means of a handle or lever (to turn it around.) On this screw-rod there is a center-point which works backward and forward to any dimension of diameter on a scale-plate, (attached to the machine,) and by which scale-plate the exact size of the cut to be made is fixed, this bearing and chisel being connected by rods forming a frame, and which rods also form a bearing for the center-point.

To cut a piece out of any material—tin or other metal—move the center-point along the screw-rod to the center of the diameter of the required cut. As marked on the scale-plate, the plate of tin or iron being fixed on the center-point, it is moved around on the edge of the circular-pointed chisel, and on which it is pressed or struck, when a perfectly-circular and even-edged piece will be cut out of the size and diameter required. The ordinary method of cutting out circular pieces is, by means of flat chisels, gouges, or circular shears, when the edges of the cut require to be made even afterward, thus wasting time and material; but by this machine a perfectly-true and evenly-edged piece is cut out at once, the whole invention combining simplicity, economy, and durability.

Disclaiming the original invention of machines for circular cutting tin, iron, or other metals,

I claim as my invention—

The combination and arrangement of the several parts, namely, the circular-pointed chisel A, in connection with the screw-rod C and the bars B, on which the center-point D works by means of the lever or handle F at end of machine; also, the scale-plate E, attached to the frame, in connection with the center-point D, to regulate the diameter of the cut to be made, all operating as and for the purposes above set forth.

Hamilton, Ontario, Dominion of Canada, March 13, 1872.

ALFRED BINGHAM.

Witnesses:
JOHN HENRY YOUNG,
WILLIAM HENRY TWICK.